(12) United States Patent
Berent

(10) Patent No.: US 8,831,341 B2
(45) Date of Patent: Sep. 9, 2014

(54) IMAGE ENCODING USING BASE COLORS ON LUMINANCE LINE

(75) Inventor: Anthony Neil Berent, Cambridge (GB)

(73) Assignee: ARM Limited, Cambridge (GB)

( * ) Notice: Subject to any disclaimer, the term of this patent is extended or adjusted under 35 U.S.C. 154(b) by 312 days.

(21) Appl. No.: 13/200,941

(22) Filed: Oct. 5, 2011

(65) Prior Publication Data

US 2012/0189199 A1   Jul. 26, 2012

(30) Foreign Application Priority Data

Jan. 25, 2011   (GB) .................................. 1101213.5

(51) Int. Cl.
*G06K 9/36* (2006.01)
*G09G 5/00* (2006.01)
*H04N 1/64* (2006.01)

(52) U.S. Cl.
CPC .................................... *H04N 1/644* (2013.01)
USPC ........................................ 382/166; 345/582

(58) Field of Classification Search
None
See application file for complete search history.

(56) References Cited

U.S. PATENT DOCUMENTS

| | | | | |
|---|---|---|---|---|
| 5,377,018 | A * | 12/1994 | Rafferty .................. | 358/426.02 |
| 5,534,915 | A * | 7/1996 | Sandrew ..................... | 348/29 |
| 6,031,937 | A * | 2/2000 | Graffagnino ............... | 382/236 |
| 6,356,588 | B1 * | 3/2002 | Otto ........................ | 375/240.03 |
| 6,788,811 | B1 * | 9/2004 | Matsuura et al. ........... | 382/166 |
| 7,949,184 | B2 * | 5/2011 | Itoh ........................ | 382/167 |
| 8,102,402 | B2 * | 1/2012 | Sorgard et al. ............ | 345/582 |
| 8,594,441 | B1 * | 11/2013 | King et al. ................ | 382/232 |
| 2002/0176622 | A1 * | 11/2002 | Watanabe et al. .......... | 382/165 |
| 2003/0223633 | A1 * | 12/2003 | Pohjola .................... | 382/166 |
| 2004/0081356 | A1 * | 4/2004 | Shimizu et al. ............. | 382/166 |
| 2004/0151372 | A1 * | 8/2004 | Reshetov et al. ........... | 382/166 |
| 2007/0092001 | A1 * | 4/2007 | Arakawa .................. | 375/240.03 |
| 2007/0237404 | A1 * | 10/2007 | Strom ...................... | 382/232 |
| 2007/0269118 | A1 * | 11/2007 | Sasaki et al. .............. | 382/232 |
| 2008/0187218 | A1 * | 8/2008 | Strom ...................... | 382/166 |
| 2009/0003692 | A1 * | 1/2009 | Pettersson et al. ......... | 382/166 |

(Continued)

FOREIGN PATENT DOCUMENTS

JP            11008770 A   *   1/1999
WO       WO 2006/126949        11/2006

OTHER PUBLICATIONS

"Absolute Moment Block Truncation Coding and Its Application to Color Images," Maximo D. Lema, et al., IEEE Transactions on Communications, Vol. COM-32, No. 10, Oct. 1984, pp. 1148-1158.*

(Continued)

*Primary Examiner* — Wenpeng Chen
(74) *Attorney, Agent, or Firm* — Nixon & Vanderhye P.C.

(57) ABSTRACT

An encoding method generates an encoded image according to a predetermined encoding format. The method includes the step of, for each block of pixels, determining an average color of colors of the block of pixels in the predetermined color space; selecting at least one luminance line in dependence on an offset in the color space of the average color from the at least one luminance line; identifying a set of candidate base colors lying on the at least one luminance line; and determining, using the set of candidate base colors and the luminance offset values, the set of encoded pixel colors. The base color and the set of luminance offsets are selected in dependence on an encoding error indicative of a sum distance in the color space between the set of encoded pixel colors and the colors of the block of pixels.

28 Claims, 10 Drawing Sheets

(56) References Cited

U.S. PATENT DOCUMENTS

2009/0046207 A1* 2/2009 Salvucci .................. 348/663
2009/0322777 A1* 12/2009 Lu et al. .................. 345/582
2012/0087581 A1* 4/2012 Rasmusson et al. .......... 382/166

OTHER PUBLICATIONS

"Compression of Digital Images by Block Truncation Coding: A Survey," Pasi Fränti, et al. The Computer Journal, 37 (4), 308-332, 1994.*

Khronos standard for the ETC format, http://www.khronos.org/registry/gles/extensions/OES/OES_compressed ETC1_RGB8_texture.txt, Apr. 2008 (8 pages).

UK Search Report for GB Application No. 1101213.5, dated May 24, 2011.

Strom, J. et al., "iPACKMAN—High_Quality, Low Complexity Texture Compression for Mobile Phones", 123 pages, (Jul. 31, 2005).

Van Waveren, J.M.P., "Real-Time DXT Compression", (May 20, 2006), 23 pages.

API Documentation, "Nvidia-Textured-Tools", (Oct. 13, 2010), 8 pages.

* cited by examiner

ABSOLUTE ENCODING:

| R FIRST | R SECOND | G FIRST | G SECOND | B FIRST | B SECOND | TABLE FIRST | TABLE SECOND | DIFF | FLIP | PIXEL MSBs | PIXEL LSBs |
|---|---|---|---|---|---|---|---|---|---|---|---|
| | | 24 BITS | | | | 3 BITS | 3 BITS | 1 BIT | 1 BIT | 16 BITS | 16 BITS |

DIFFERENTIAL ENCODING:

| R FIRST | R OFFSET | G FIRST | G OFFSET | B FIRST | B OFFSET | TABLE FIRST | TABLE SECOND | DIFF | FLIP | PIXEL MSBs | PIXEL LSBs |
|---|---|---|---|---|---|---|---|---|---|---|---|
| 5 BITS | 3 BITS | 5 BITS | 3 BITS | 5 BITS | 3 BITS | 3 BITS | 3 BITS | 1 BIT | 1 BIT | 16 BITS | 16 BITS |

IMAGE ENCODING USING BASE COLORS ON LUMINANCE LINE

This application claims priority to GB Application No. 1101213.5 filed 25 Jan. 2011, the entire contents of which are incorporated herein by reference.

FIELD OF THE INVENTION

The present invention is relates to encoding methods for encoding an image according to a predetermined encoding format. In particular the present invention is concerned with such encoding methods when the predetermined encoding format encodes the image in blocks of pixels, each block of pixels being encoded as a set of encoded pixel colours comprising a base colour and a set of luminance offsets with respect to that base colour.

BACKGROUND OF THE INVENTION

Various encoding formats for encoding an image are known. The particular techniques embodied by these formats vary depending on the relative importance of various factors in the resulting encoded image, such as whether the encoding should be lossless, the desired data size of the resulting encoding image and the overall quality of the encoded image. A widely used and well known set of encoding formats for images are those defined by the JPEG group. However, predetermined encoding formats such as JPEG are not suitable for all applications, in particular those in which random access to areas of pixels in the encoded image is required. This may for example be the case when the encoded image provides a compressed texture to be used in graphics applications. This is because encoding formats such as JPEG rely on techniques which encode blocks of pixels within an image with respect to previous blocks within the same image. Whilst this enables a higher degree of data compression, this approach requires the image to be decoded as a whole and hence such encoding formats are not suitable for applications such as texture rendering, which require random access to subsections of a given image.

Consequently, it is known to encode images according to predetermined encoding formats which do allow such random access. Typically, in such encoding formats, the image is encoded in blocks of pixels (e.g. 4×4) representing the smallest units of the image which can be individually encoded and decoded. One known technique in such encoding formats is to represent the block of pixels by a base colour and a set of luminance offsets with respect to that base colour. In other words, for each block encoded in this manner, only one colour is defined for all of the pixels, with the luminance of each pixel being given as an offset from that base colour. This generally produces an acceptable image quality, because the human eye is less sensitive to local chrominance variation than to local luminance variation.

However, a problem associated with generating encoded images according to such encoding formats (of which the ETC format (Ericsson Texture Compression) is one example) is the processing time required to generate the compressed (encoded) images. For example, when using existing tools to create ETC compressed textures the processing time can be around 300 to 400 pixels per second, or 30 minutes to one hour for a typical texture, for the highest quality supported by those tools. This lengthy processing time results from the searching which is performed within the available encoding space to find the best combination of base colour and luminance offsets for each block of pixels. To produce the highest quality compressed textures the search is multi-dimensional and extensive, resulting in these long processing times. Such long processing times however are unacceptable when developing and testing graphics applications, since applications may include dozens or hundreds of textures, and developers need to be able to assess the quality of the compressed textures during development.

FIG. 1A schematically illustrates a block of 4×4 pixels 10. Typically, when such a block of pixels is encoded according to encoding formats such as ETC, each block is in fact encoded in terms of two half-blocks adjacent to one another. As illustrated in FIG. 1A the block of pixels 10 may be divided by a vertical split into the two half-blocks. Equally, the same block of pixels may be divided into two half-blocks by means of a horizontal split.

The ETC encoding format defines eight tables of luminance offsets as illustrated in FIG. 1B. Hence, a base colour is defined for each half-block, and the eight pixels in that half-block are encoded by means of one three bit table number and eight two bit table entry numbers.

Two varieties of encoding are defined according to the ETC standard, namely absolute encoding and differential encoding, as illustrated in FIG. 1C. Each results in the block of pixels being encoded as a single 64 bit value. In absolute encoding, each half-block is independently encoded. The base colour for each half-block is encoded as a 12 bit (444) RGB value, and the encoding of the whole block is represented by 24 bits giving the R, G and B components of the base colours for the first and second half-blocks making up this block. This is followed by two three bit values giving the luminance offset table used for each half-block. The "diff" bit indicates whether this block has been encoded using absolute or differential encoding. The "flip" bit indicates whether the block has been split horizontally or vertically into half-blocks. Finally, the 16 individual pixels of the two half-blocks are each represented by two bits giving their corresponding entry in the selected table. The encoding format groups these as 16 MSBs and 16 LSBs.

The differential encoding is similarly defined, except that here the base colour of the second half-block is defined as an offset with respect to the first half-block. Hence, the first half-block base colour is given as a 15 bit (555) RGB value and the R, G and B offsets for the second half-block are each given as three bit offsets. This enables greater precision in defining the base colours, but only if the base colours of the half-blocks are close enough to one another to be represented by these three bit offsets. Otherwise the absolute encoding is used.

The 24 bits used to encode the base colours for the half-blocks correspond to a predetermined set of base colours which may be defined in the encoding. This predetermined set of base colours is schematically illustrated in FIG. 2A. Note that for clarity of illustration only a two dimensional representation is shown in which only the R and G components are shown (the B component in the third dimension being omitted). The base colour selected for the encoding of a given half-block is typically selected with reference to the average colour of the pixels in the half-block. Since the encoded pixels are encoded as luminance offsets with respect to a selected base colour, the diagonal lines (luminance lines) in FIG. 2A constrain where encoded pixels may lie in this colour space.

As illustrated in FIG. 2A, there is more than one way to choose the base colour from the predetermined set of base colours available for a given calculated average colour. Base colour 30 is the nearest base colour on the nearest luminance line, whilst base colour 40 is the geometrically nearest base colour.

FIG. 2B graphically illustrates the encoding of a given pixel value by means of a luminance offset from a base colour. The luminance offset (selected from a predefined table of luminance offsets) gives the position in this colour space of the compressed pixel colour relative to the base colour. The distance between the compressed pixel colour and the original pixel colour gives the encoding error for this pixel.

FIG. 3 shows the search range performed by an existing ETC compression algorithm for the base colour of each half-block of pixels. Having selected an initial base point (i.e. base colour) in dependence on the average colour of the pixels of the half-block, a search is performed in a volume of base points around that starting base point to see if an improved encoding can be found. In the high quality version of the compression, a 7×7×7 search volume is explored (represented as a 7×7 search area in the 2D representation shown). Amongst these the encoding which minimises the overall encoding error for the half-block is selected. It is the iterative process of calculating the best encoding for all eight possible tables for each of these 7×7×7 (i.e. 343) candidate base points which results in the lengthy processing procedure for existing compression tools.

Descriptions of some existing approaches to such image encoding/compression can be found in:

the presentation "iPACKMAN—High-Quality, Low Complexity Texture Compression for Mobile Phones" by Jacob Strom and Tomas Akenine-Moller (retrieved from http://www.graphicshardware.org/previous/www_2005/presentations/strom-ipackman-gh05.ppt) which describes the ETC compression format;

in the full Khronos standard for the ETC format (available at http://www.khronos.org/registry/gles/extensions/OES/OES_compressed_ETC1_RGB8_texture.txt);

in the paper "Real Time DXT Compression", J. M. P. van Waveren, May 2006 (http://cache-www.intel.com/cd/00/00/32/43/324337_324337.pdf); and in a description of NVIDIA texture tools (retrieved on 12 Nov. 2010 from: http://code.google.com/p/nvidia-texture-tools/wiki/ApiDocumentation).

However, the above described lengthy processing times are prevalent in the prior art approaches and accordingly, it would be desirable to provide an improved technique for generating high quality encodings, which require less processing time.

SUMMARY OF THE INVENTION

Viewed from a first aspect, the present invention provides an encoding method of generating an encoding of an image according to a predetermined encoding format, wherein said predetermined encoding format encodes said image in blocks of pixels, each block of pixels being encoded as a set of encoded pixel colours comprising a base colour and a set of luminance offsets with respect to said base colour, wherein said base colour is selected from a predetermined set of base colours defined in a predetermined colour space, wherein said set of luminance offsets is encoded as a set of references to at least one predetermined table of luminance offset values, and wherein said predetermined set of base colours and said luminance offset values define a set of luminance lines in said predetermined colour space, said encoded pixel colours lying on at least one of said luminance lines, said method comprising the steps, performed for each block of pixels, of:

determining an average colour of colours of said block of pixels in said predetermined colour space;

selecting at least one luminance line in dependence on an offset in said colour space of said average colour from said at least one luminance line;

identifying a set of candidate base colours lying on said at least one luminance line; and determining, using said set of candidate base colours and said luminance offset values, said set of encoded pixel colours, wherein said base colour and said set of luminance offsets are selected in dependence on an encoding error indicative of a sum distance in said colour space between said set of encoded pixel colours and said colours of said block of pixels.

When encoding an image according to a predetermined encoding format in which the image is encoded in blocks of pixels, each block of pixels being encoded as a set of encoded pixel colours comprising a base colour and a set of luminance offsets with respect to that base colour, the inventor of the present invention realised that an improved method could be provided by selecting the base colour for each block of pixels from a candidate set of base colours lying on at least one luminance line running through the predetermined colour space in which the encoding operates. Luminance lines in the predetermined colour space are defined by the predetermined set of base colours available for the encoding. Accordingly, according to the techniques of the present invention, for each block of pixels to be encoded, firstly the average colour of the pixels of that block of pixels is determined and then at least one luminance line is selected in dependence on an offset in the predetermined colour space of the average colour from the at least one luminance line. This at least one luminance line then provides a set of candidate base colours which are then used to determine the final encoding.

It has been found that rather than identifying a set of candidate base colours using, say, a set of base colours forming a cube approximately centred on the average colour of the block of pixels to be encoded (e.g. the 7×7×7 search volume illustrated in FIG. 3), an improved encoding method is provided if the candidate base colours are selected with reference to luminance lines running through the predetermined colour space.

This is due to the fact that an encoding format which encodes blocks of pixels as a base colour and set of luminance offsets with respect to that base colour provides far greater flexibility in setting luminance values than in setting chrominance values. Furthermore, since the encoded pixel colours are constrained to lie on one of the luminance lines running through the predetermined colour space (because each encoded pixel colour is represented as an offset along one of these luminance lines from a base colour which lies somewhere on the luminance line), identifying the best base colour to use for the encoding of a particular block of pixels is improved by performing this selection with reference to luminance lines rather than by using a spatial search around the average pixel colour of the block of pixels. This technique may be of particular benefit, for example, when the colours of the block of pixels are widely distributed in the predetermined colour space, meaning that the position of the average colour of the block of pixels is not particularly representative of the individual pixel colours. In such a situation, a luminance line may be is better suited to providing the candidate base colours than a predetermined search space around the average colour.

A further factor which makes the luminance line based approach more advantageous is that the luminance lines, which define lines of increasing luminance in the predetermined colour space, are not necessarily lines of constant chrominance, since the luminance can be increased or decreased beyond a point at which a component of the colour saturates. Seen graphically this represents the situation in which a luminance line meets the edge of the predetermined colour space. Hence, the luminance lines do not necessarily take a single straight path through the predetermined colour space. Consequently there may exist a luminance line which better matches a given set of pixel colours, whilst the average colour of those pixels on the other hand lies nearer to base colours which would only allow a poor encoding of the pixel colours. This may particularly be the case when the base colours which are closest to the average pixel colour in the predetermined colour space are significantly different from the individual pixel colours in terms of chrominance, since the predetermined encoding format only allows individual pixels to vary in terms of a luminance offset from the base colour and hence this chrominance difference may result in a large encoding error (between the encoded pixel colours and the original pixel colours).

It will be appreciated that there are various ways in which the offset can be defined, but in one embodiment said offset in said colour space is a distance of closest approach between said average colour and said at least one luminance line.

It will also be appreciated that there are various ways in which the encoding error can be defined, but in one embodiment said encoding error is calculated as a sum of squared distances between said set of encoded pixel colours and said colours of said block of pixels.

In one embodiment, said step of selecting said at least one luminance line comprises selecting three luminance lines with smallest values of said offset. The selection of three luminance lines is particularly appropriate in the context of a three dimensional predetermined colour space (e.g. RGB), since a given average colour position will be surrounded by three luminance lines. Which of these three luminance lines will prove to be most suitable for providing the base colour for the encoding will depend on the position of the colours of the pixels of the block of pixels with respect to each line.

In one embodiment, said step of selecting at least one luminance line comprises an iterative luminance line selection procedure, said iterative luminance line selection procedure comprising the steps of:
  examining a neighbouring luminance line of an already-selected luminance line; and
  if a total offset of said colours of said block of pixels from said neighbouring luminance line is not greater than a total offset of said colours of said block of pixels from said already-selected luminance line, selecting said neighbouring luminance line.

Accordingly, more than one luminance line may be selected by means of this iterative luminance line selection procedure. The proposal of this iterative luminance line selection procedure is based in the recognition that an initial luminance line selected in dependence on its offset in the predetermined colour space from the average colour of the block of pixels may not in fact provide the base colour which is the best encoding for the block of pixels. For example, because of the paths that the luminance lines take through predetermined colour space, a luminance line which most closely approaches the individual pixel colours may not be the same as the luminance line which most closely approaches the average colour of those pixels. Hence, the iterative luminance line selection procedure examines a neighbouring luminance line and compares the total offset of the colours of the block of pixels from that neighbouring luminance line with a total offset of the colours of the blocks of pixels from an already-selected luminance line, and if the neighbouring luminance line is shown to more closely approach the colours of the blocks of pixels (in terms of the total offset) then this neighbouring luminance line is also selected.

It will be recognised that there are various ways in which the total offsets could be calculated, but in one embodiment said total offsets are calculated as a sum of squared distances between said colours of said block of pixels and respective nearest points of each luminance line.

In one embodiment, said neighbouring luminance line is only examined if said neighbouring luminance line represents an increase in colour saturation from said already-selected luminance line. In considering the luminance lines in the predetermined colour space, it has been realised that the luminance line that lies closest to the colours of a block of pixels (for example in terms of a root mean squared (RMS) distance) is either the line closest to the average colour of the pixels or a line with a more saturated colour than this line. Hence when selecting further luminance lines as part of the iterative luminance line selection procedure it is advantageous to only consider selecting a neighbouring luminance line if its represents an increase in colour saturation from an already-selected luminance line.

In one embodiment, said neighbouring luminance line is only examined if said already-selected luminance line has a non-zero value of said total offset. It has been realised that some particular configurations of pixel colours may result in a zero value of the total offset between those pixel colours and a given luminance line. For example this may be the case if the pixel colours lie directly on one or more luminance lines, this for example being possible if the pixel colours lie on the fully colour saturated edge of the predetermined colour space. In this situation it is not necessary to examine neighbouring luminance lines.

In one embodiment, when a plurality of luminance lines is selected, said plurality of luminance lines is sorted by said total offset for each luminance line. Given that the encoding error for any given set of encoding pixel colours must be at least the total offset for the corresponding luminance line, it is advantageous when there is a plurality of luminance lines to sort those luminance lines in terms of their total offsets. On average, the luminance line with the smallest total offset is most likely to yield the lowest encoding error. However, it should be recognised that the line with the smallest total offset will not necessarily yield the lowest encoding error, since this will depend on the particular positions of the pixel colours with respect to the available base colours on that luminance line. For example, this may happen if the pixel colours happen to fall a relatively long way from the available base colours, then another luminance line may provide a smaller encoding error for this block of pixels.

In one embodiment, said step of determining said set of encoded pixel colours comprises an iterative luminance line consideration procedure, wherein said step of identifying a set of candidate base colours lying on said at least one luminance line and said step of determining said set of encoded pixel colours are performed for said plurality of luminance lines in order of increasing total offset. Having selected a plurality of luminance lines, the most procedurally efficient way of examining them is in order of increasing total offset.

In one embodiment, said step of determining said set of encoded pixel colours comprises an iterative encoding determination procedure comprising the steps, for each candidate base colour of said set of candidate base colours, of:
  determining a candidate set of encoded pixel colours using said luminance offset values applied to said candidate base colour;
  determining a candidate encoding error for said candidate set of encoded pixel colours indicative of a sum distance in said colour space between said colours of said block of pixels and said candidate set of encoded pixel colours;

if said candidate encoding error is lower than any previous candidate encoding errors determined for said block of pixels, setting said candidate encoding error as a best encoding error;

selecting as said base colour and said set of luminance offsets the candidate base colour and those luminance offset values which when applied to said candidate base colour give said best encoding error.

Accordingly, having determined a set of candidate base colours, each may be taken in turn to determine a candidate set of encoded pixel colours using the luminance offset values applied to that candidate base colour. On this basis a candidate encoding error may be determined indicative of a sum distance in the colour space between the colours of the block of pixels and the candidate set of encoded pixel colours. For each candidate encoding error thus determined, if it is found to be lower than any previous candidate encoding error it is set as the best encoding error. Thus as each candidate base colour is considered, track is kept of the best encoding error thus far found, and at the end of the process the base colour and set of luminance offsets which gave this best encoding error can be used as the chosen base colour and set of luminance offsets for this block of pixels.

In one embodiment, said at least one predetermined table of luminance offset values comprises a plurality of predetermined tables of luminance offset values, and said step of determining said candidate set of encoded pixel colours using said luminance offset values applied to said candidate base colour comprises iteratively determining said candidate set of encoded pixel colours using each table of said plurality of predetermined tables of luminance offset values.

Thus, when a plurality of predetermined tables of luminance offset values is provided, the step of determining the candidate set of encoded pixel colours using the luminance offset values applied to the candidate base colour may try each table of luminance offset values in turn to seek to find the best encoding error.

In one embodiment, said encoding error is determined cumulatively as a cumulative encoding error and, if said cumulative encoding error for a current table of luminance offset values under consideration exceeds said best encoding error, said determining said candidate set of encoded pixel colours using said current table of luminance offset values is terminated. Hence as each table of luminance offset values is considered, the encoding error can be determined cumulatively, and if this cumulative error exceeds a best encoding error previously found it is known that the final encoding error using this table can only exceed the best encoding error found so far, and processing time can be saved by terminating the calculation for this table of luminance offset values. This cumulative encoding error can be evaluated on a pixel-by-pixel basis and in one embodiment said cumulative encoding error is compared with said best encoding error on a pixel-by-pixel basis for said colours of said block of pixels. Hence, as soon as the calculation for a given pixel pushes the cumulative error beyond the best encoding error thus far found, consideration of this table of luminance offset values (as applied to the current base colour under consideration) can be terminated.

In one embodiment, before considering a next luminance line, if said total offset for said next luminance line exceeds said best encoding error said iterative luminance line consideration procedure is terminated and neither said next luminance line nor any further luminance lines in said plurality of luminance lines are considered. This is due to the fact that, as mentioned above, the encoding error using a base colour on a given luminance line must be at least as large as the total offset for that luminance line. Hence, during the iterative luminance line consideration procedure if it is found that the total offset for a next luminance line exceeds the best encoding error found so far, it can immediately be concluded that this next luminance line cannot improve on the best encoding error, nor can any further luminance lines, since these are sorted by total offset. As such, the best encoding error found so far cannot be improved on and the iterative luminance line consideration procedure can be immediately terminated.

In one embodiment, said blocks each comprise a set of 2 pixels by 4 pixels.

In one embodiment, at least one pair of adjacent blocks of said blocks of pixels is encoded in an interdependent fashion, a second block of said adjacent pair of blocks being encoded with reference to a first block of said adjacent pair of blocks. It may be found to be advantageous, in terms of encoding efficiency, for an adjacent pair of blocks to be encoded in an interdependent fashion. For example, if the base colours for two adjacent blocks of pixels are to be encoded using 24 bits, whilst each base colour could be encoded using 12 bits, greater precision for defining the base colours may be achieved by encoding one base colour using 15 bits (e.g. RGB 555), whilst the other base colour is defined as a set of 3-bit offsets with respect thereto. This is of course only possible if the difference between the base colours of the two blocks is sufficiently small to be represented in this set of 3-bit offsets.

In one embodiment, said pair of blocks are horizontally adjacent, whilst in another embodiment, said pair of blocks are vertically adjacent.

In one embodiment, the method further comprises determining for each block of pixels if said encoding error is lower when that block of pixels in encoded in said interdependent fashion or when that block of pixels in encoded in an independent fashion without reference to another block of pixels. The encoding fashion which gives the lowest encoding error for that block of pixels may then be selected.

In one embodiment, the method further comprises iteratively determining for each block of pixels said encoding error for all encoding fashions and selecting the encoding fashion which gives an overall lowest value of said encoding error. Hence, on a block-by-block basis, each permutation of independent/interdependent encoding and horizontal/vertical splitting may be tested to determine which permutation gives the best encoding. It may also be determined, for each variety of the interdependent encoding, whether a lower encoding error is produced if (giving the pair of blocks the arbitrary labels first and second) the first block is dependent on the second block, or vice versa.

In one embodiment calculations of distances in said colour space are perception-weighted according to human sensitivity to each colour component of said colour space. Because of the differences in sensitivity of the human eye to different colour components, a perceived improvement in the quality of the encoding can be gained by factoring this phenomenon in to the distance calculations.

In one embodiment said encoding error is calculated as a peak signal to noise ratio. This may also be judged to give an improved quality of encoding.

In one embodiment said image is a texture image. Texture images need to be randomly accessed by graphics applications and hence a block-wise encoding is particularly suitable.

In one embodiment said predetermined encoding format is an ETC format.

Viewed from a second aspect, the present invention provides a computer program product storing in a non-transient fashion a computer program configured cause a computer to carry out the encoding method of the first aspect.

Viewed from a third aspect, the present invention provides an encoding apparatus configured to generate an encoding of an image according to a predetermined encoding format, wherein said predetermined encoding format encodes said image in blocks of pixels, each block of pixels being encoded as a set of encoded pixel colours comprising a base colour and a set of luminance offsets with respect to said base colour, wherein said base colour is selected from a predetermined set of base colours defined in a predetermined colour space, wherein said set of luminance offsets is encoded as a set of references to at least one predetermined table of luminance offset values, and wherein said predetermined set of base colours and said luminance offset values define a set of luminance lines in said predetermined colour space, said encoded pixel colours lying on at least one of said luminance lines, said apparatus, configured to act on each block of pixels, comprising:

an average colour determination unit configured to determine an average colour of said block of pixels in said predetermined colour space;

a luminance line selection unit configured to select at least one luminance line in dependence on an offset in said colour space of said average colour from said at least one luminance line;

a candidate base colour identifier configured to identify a set of candidate base colours lying on said at least one luminance line; and a determination unit configured to determine, using said set of candidate base colours and said luminance offset values, said set of encoded pixel colours, wherein said base colour and said set of luminance offsets are selected in dependence on an encoding error indicative of a sum distance in said colour space between said set of encoded pixel colours and said colours of said block of pixels.

Viewed from a fourth aspect the present invention provides encoding apparatus means for generating an encoding of an image according to a predetermined encoding format, wherein said predetermined encoding format encodes said image in blocks of pixels, each block of pixels being encoded as a set of encoded pixel colours comprising a base colour and a set of luminance offsets with respect to said base colour, wherein said base colour is selected from a predetermined set of base colours defined in a predetermined colour space, wherein said set of luminance offsets is encoded as a set of references to at least one predetermined table of luminance offset values, and wherein said predetermined set of base colours and said luminance offset values define a set of luminance lines in said predetermined colour space, said encoded pixel colours lying on at least one of said luminance lines, said apparatus means, configured to act on each block of pixels, comprising:

average colour determination means for determining an average colour of said block of pixels in said predetermined colour space;

luminance line selection means for selecting at least one luminance line in dependence on an offset in said colour space of said average colour from said at least one luminance line;

candidate base colour identification means for identifying a set of candidate base colours lying on said at least one luminance line; and determination means for determining, using said set of candidate base colours and said luminance offset values, said set of encoded pixel colours, wherein said base colour and said set of luminance offsets are selected in dependence on an encoding error indicative of a sum distance in said colour space between said set of encoded pixel colours and said colours of said block of pixels.

BRIEF DESCRIPTION OF THE DRAWINGS

The present invention will be described further, by way of example only, with reference to embodiments thereof as illustrated in the accompanying drawings, in which.

DESCRIPTION OF EMBODIMENTS

Figures 1A, 1B, 1C:
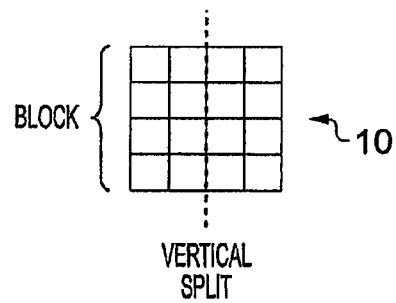
FIG. 1A schematically illustrates a block of pixels to be encoded, which is divided vertically into two half-blocks.
FIG. 1B shows the set of eight predetermined luminance offset tables defined by the ETC format.
FIG. 1C shows the breakdown of the 64 bit encoding of each block of pixels according to the ETC format, both for absolute encoding and for differential encoding.
Figure 2A:
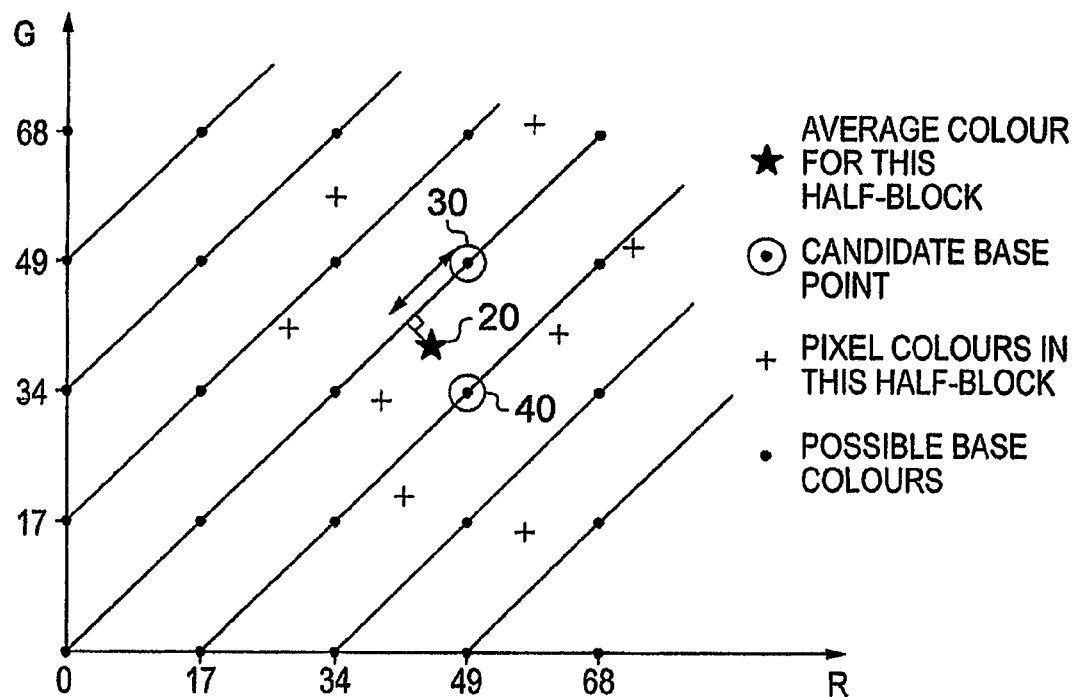
FIG. 2A shows a set of pixel colours, the average colour of those pixels, and the predetermined set of possible base colours in a predetermined colour space.
Figure 2B:
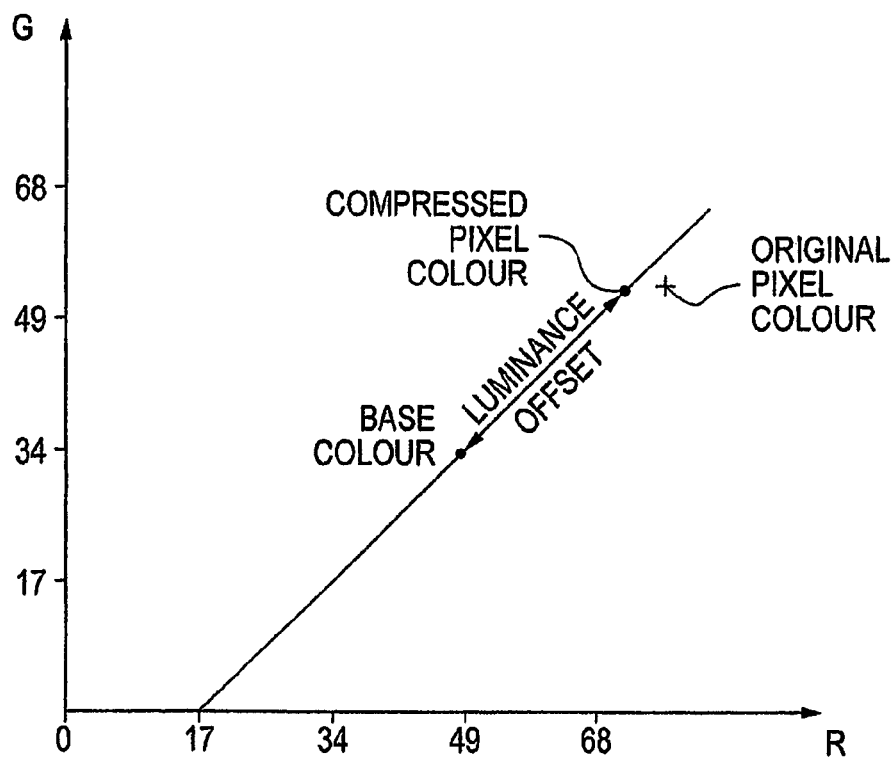
FIG. 2B illustrates the encoding of a compressed pixel colour by a base colour and a luminance offset compared with an original pixel colour.
Figure 3:
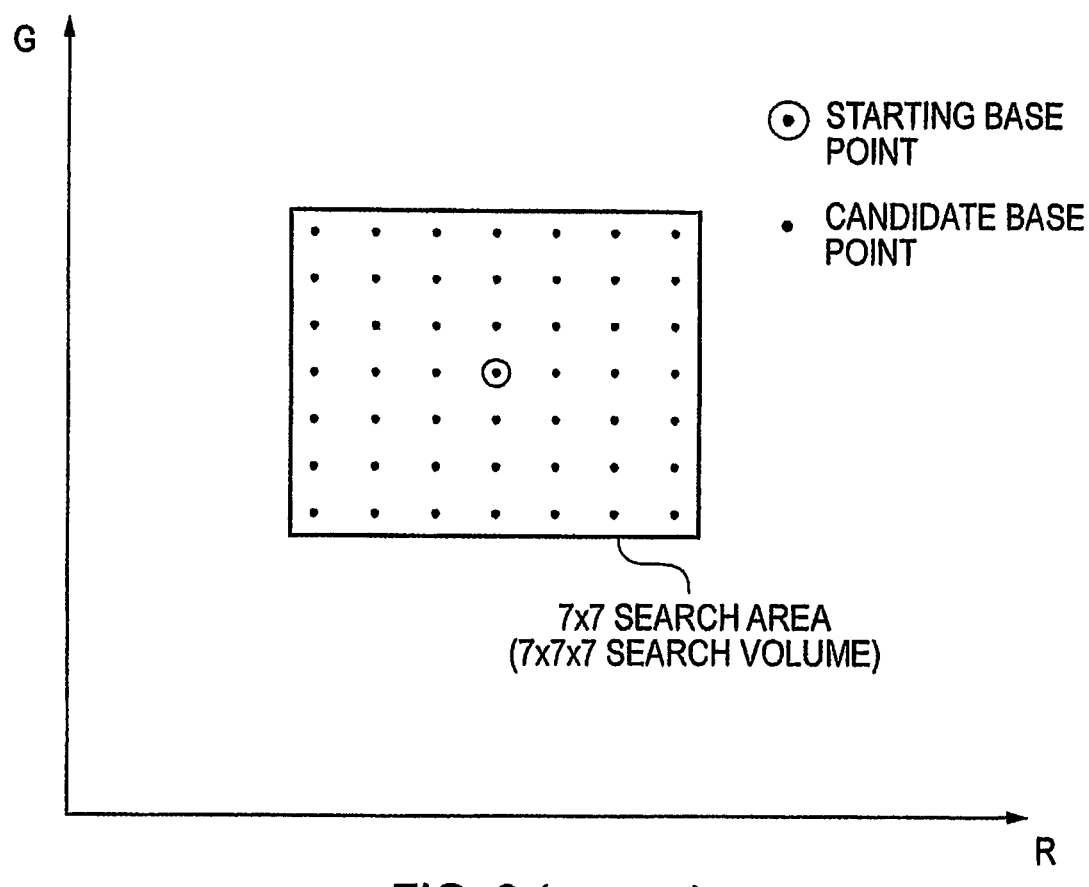
FIG. 3 shows a search area (volume) within which candidate base points are considered according to a prior art encoding method.
Figure 4A:
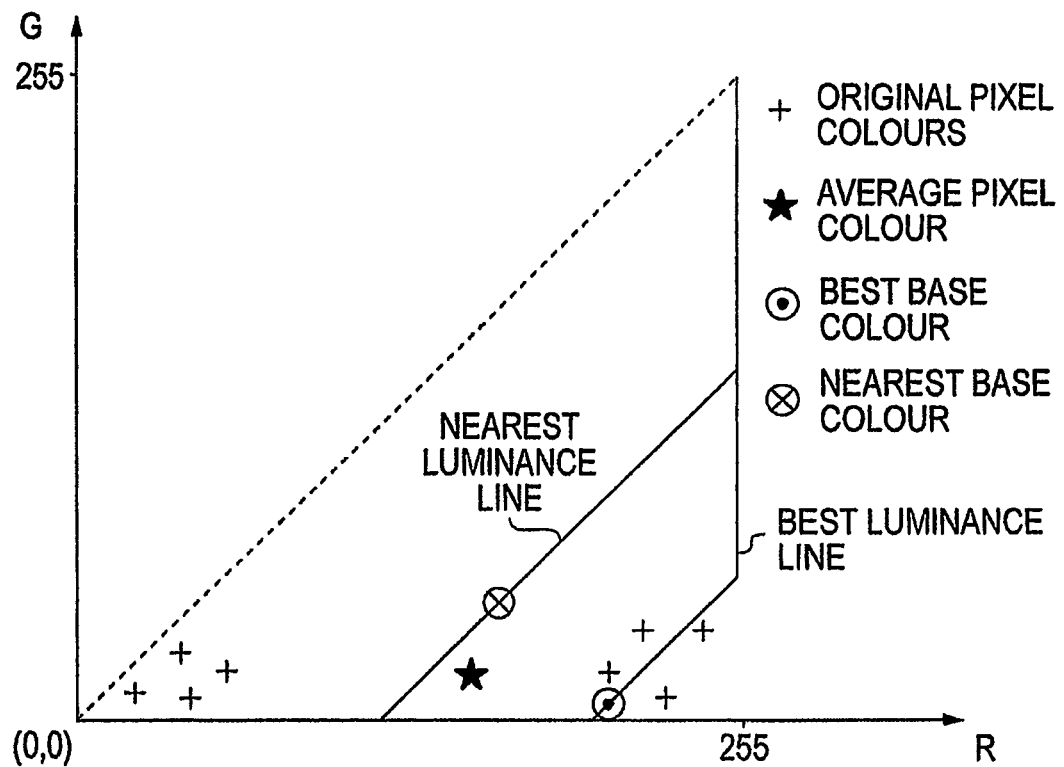
FIG. 4A illustrates the nearest luminance line to an average pixel colour and the best luminance line with respect to the original pixel colours.
Figure 4B:
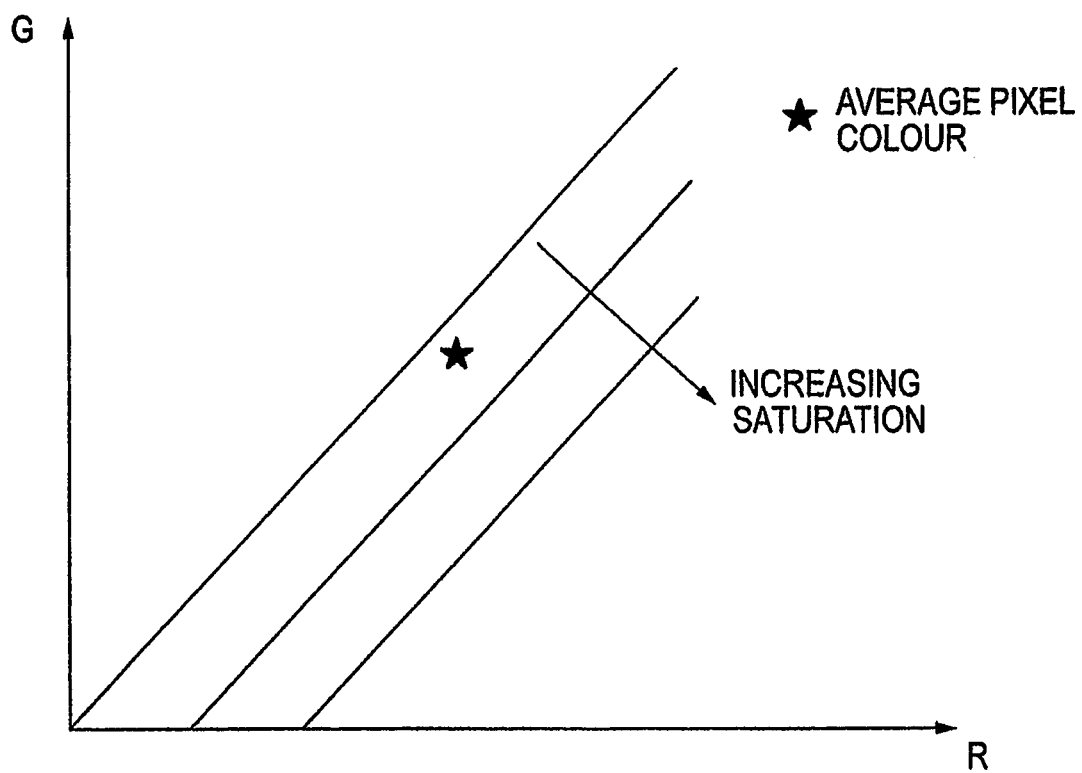
FIG. 4B illustrates a set of luminance lines indicating the direction of increasing colour saturation.

FIG. 4A illustrates a set of eight pixel colours from a block of pixels (specifically from a half-block of 2×4 pixels), which illustrates why the vicinity of the average pixel colour may not contain the best base colour for encoding these pixel colours. Due to the fact that the original pixel colours are spread across two groups, one relatively close to the origin and one at high R/low G, the average pixel colour falls somewhere between these two groups at a middle R/low G value. NB it should be appreciated that whilst FIGS. 4A and 4B are shown for a two dimensional colour space (RG) this is only for clarity of illustration and the predetermined colour space will more commonly be three dimensional (RGB). It can be seen from FIG. 4A that the nearest base colour (on the "nearest luminance line") to the average pixel colour can only be expected to provide a set of encoded pixel colours with a relatively large encoding error. Whilst the group of pixels on the left do not deviate greatly from the luminance line on which this base colour lies, and hence could be encoded reasonably well with a relatively large negative luminance offset, the group of pixel colours on the right remain at a significant distance from this luminance line and hence can only be encoded with a relatively large encoding error. By contrast, it can be seen that the best base colour lies on a luminance line ("best luminance line") which runs closer to both the left hand group of pixels and the right hand group of pixels.

It has in particular been recognised by the inventor of the present invention, that an improvement in the encoding error that can be achieved for a given group of pixel colours by selecting a luminance line which is not the closest luminance line to the average pixel colour of those pixels can only occur (if it will happen at all) for luminance lines which represent an increase in colour saturation with respect to the luminance line nearest to the average pixel colour. The progression of increasing colour saturation of luminance lines is shown in FIG. 4B. Referring back to FIG. 4A, the "best luminance line" is at higher colour saturation than the "nearest luminance line". Consequently, embodiments of the present invention propose an iterative luminance line selection procedure, wherein luminance lines of increasing colour saturation are iteratively considered (as will be described in more detail below).

Figure 5A:
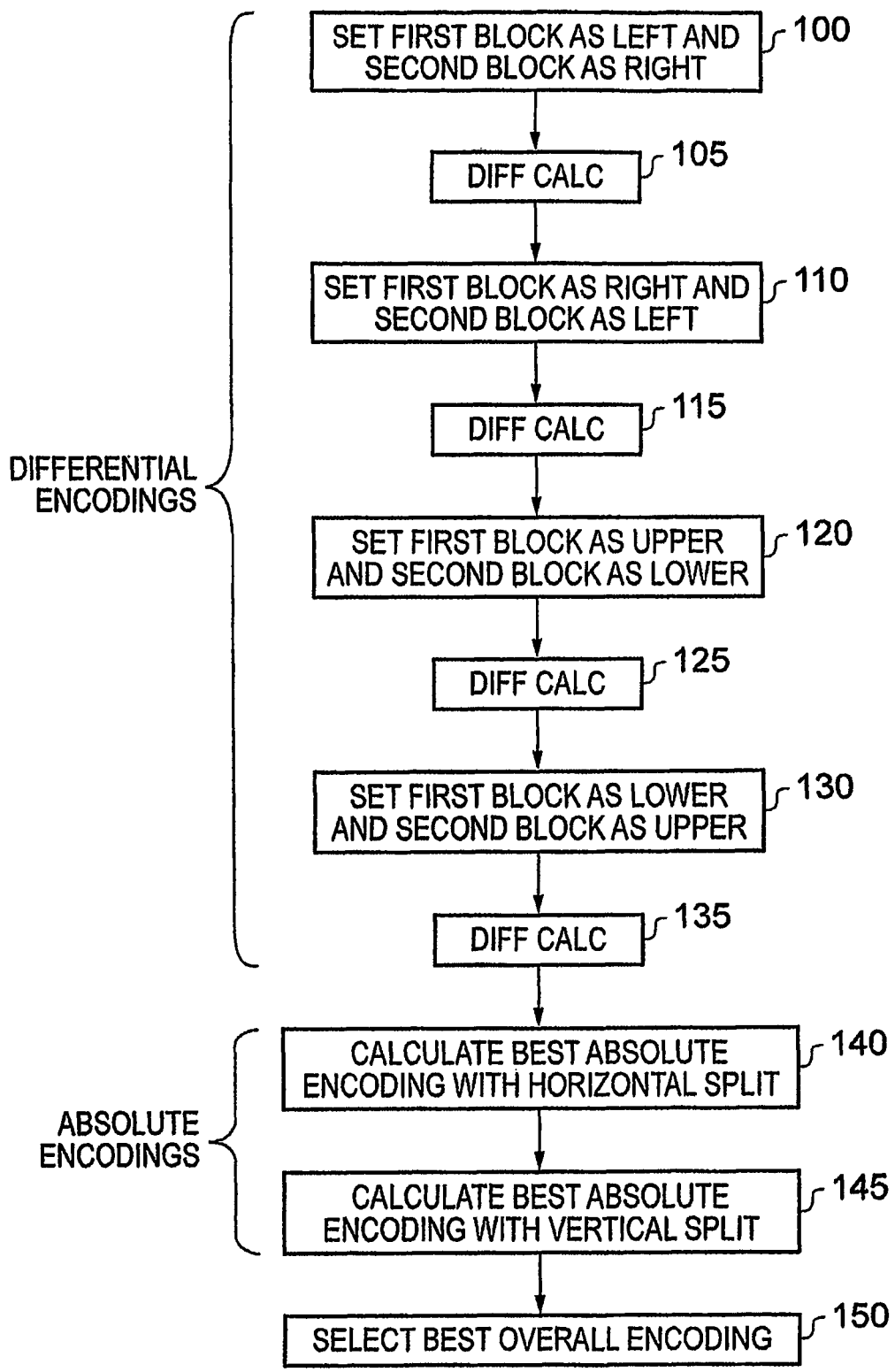
FIG. 5A schematically illustrates a series of steps taken in one embodiment to determine the best encoding for a given block of pixels.
Figure 5B:
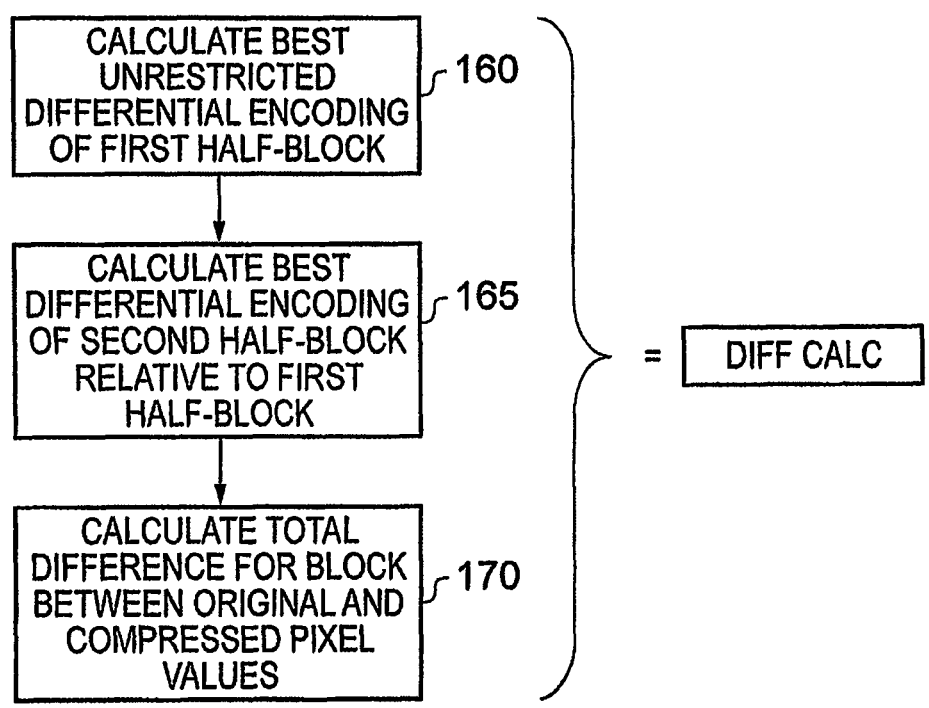
FIG. 5B illustrates the steps involved in the differential calculation used in the process shown in FIG. 5A.

The overall encoding procedure of one embodiment of the present invention is schematically set out in FIG. 5A. Each block of 4×4 pixels is treated according to the steps set out in FIG. 5A. Firstly, in steps 100-135, a number of differential encoding calculations are performed. These comprise dividing the 4×4 block into two 2×4 half-blocks and determining an encoding of one half-block with respect to the other. The division of the block into two half-blocks can be either horizontal or vertical and each half-block can be treated as the "first" half-block with respect to which the "second" half-block is differentially encoded. Firstly, at step 100 the block is divided vertically and the left half-block is set as the "first block" and the right half-block is set as the "second block". Then at step 105 the differential calculation is performed to determine the encoding error for this permutation. The differential calculation at step 105 is carried out as illustrated in the FIG. 5B. Here, at step 160 firstly the best unrestricted differential encoding is calculated for the first half-block. Then at step 165 the best differential encoding of the second half-block relative to the first half-block is determined. Finally, at step 170 the overall encoding error for the block is determined based on the difference (in the colour space) between the original and the compressed pixel values.

Returning to FIG. 5A, the process carried out in steps 100 and 105 is then repeated in steps 110 and 115, except that now the right hand half-block is set as the "first block" and the left hand half-block is set as the "second block". Similarly, in steps 120, 125, 130 and 135, the same procedure is carried out, but now splitting the block horizontally into an upper half-block and a lower half-block, and the differential calculation is carried out for the upper half-block with respect to the lower half-block and then reversed, i.e. for the lower half-block with respect to the upper half-block.

The differential encoding permutations have thus all been considered, and at step 140 the best absolute encoding is determined with respect to a horizontal split into two half-blocks, whilst at step 145 the best absolute encoding with respect to a vertical split into two half-blocks is calculated. Finally at step 150 the best overall encoding giving the lowest encoding error for the block as a whole is selected as the chosen encoding for this block. The detail of how the best encoding for each half-block is determined will now be described with reference to FIGS. 6, 7 and 8.

Figure 6:
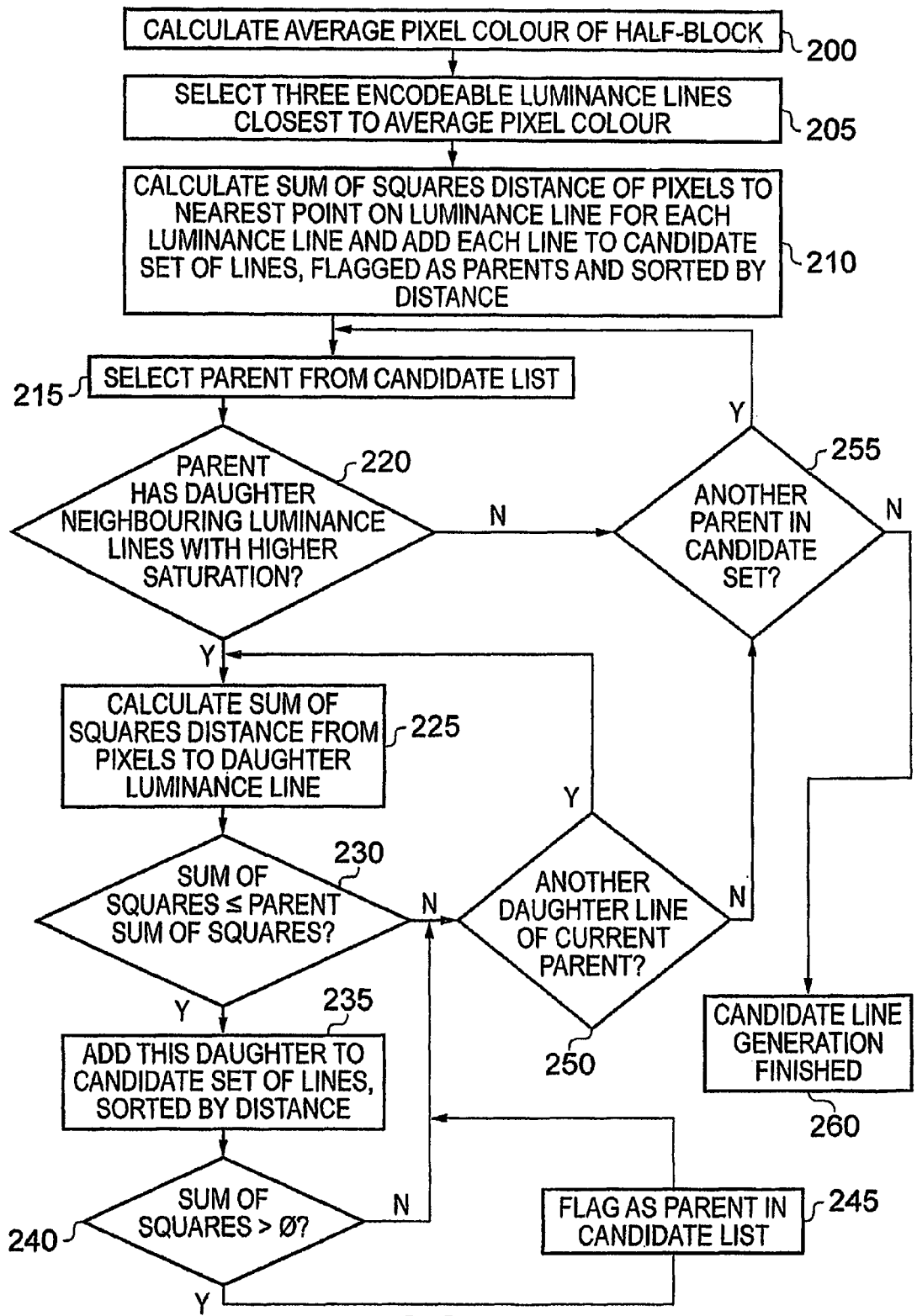
FIG. 6 schematically illustrates a series of steps taken in one embodiment when determining a candidate set of luminance lines.
Figure 7:
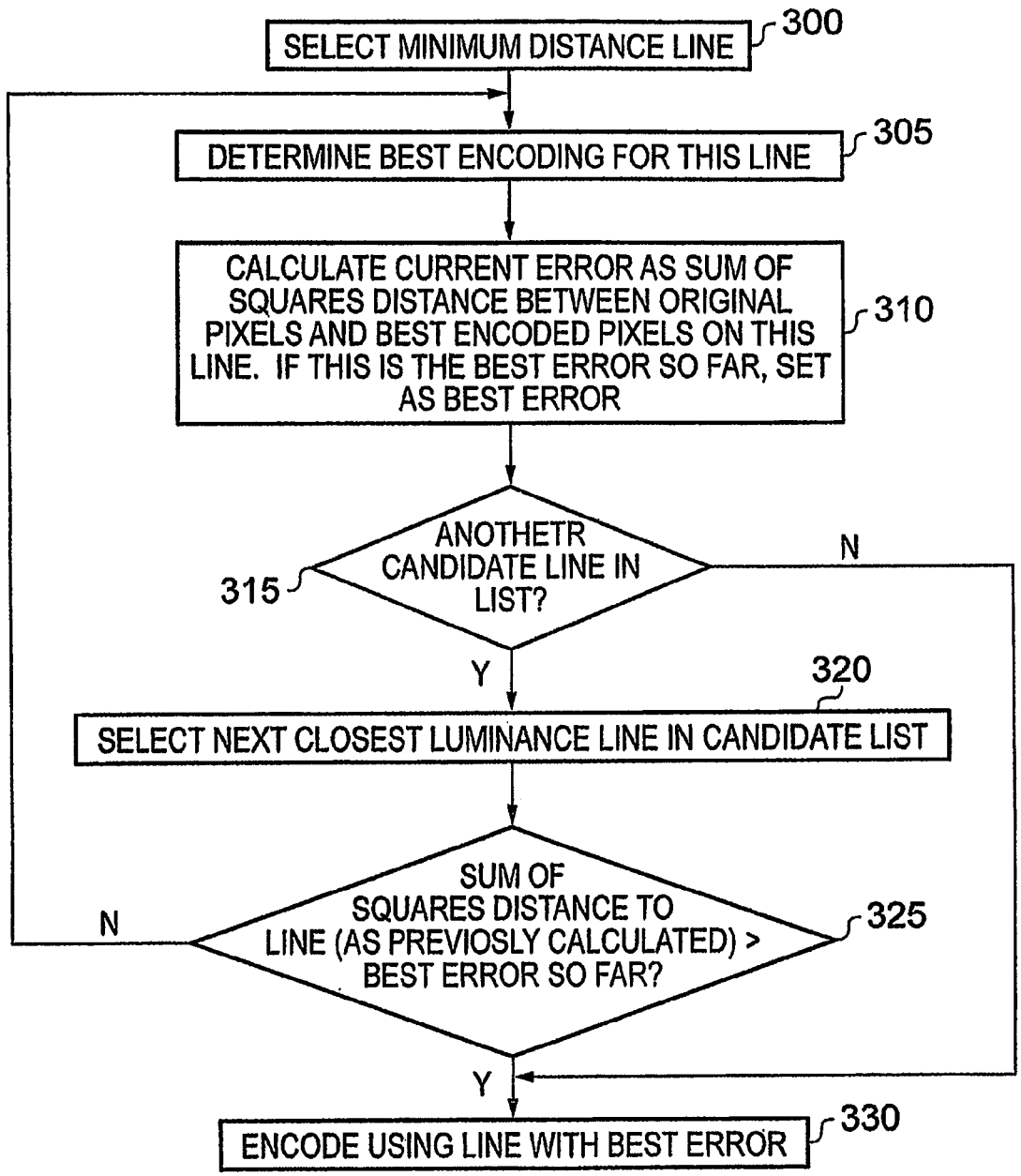
FIG. 7 schematically illustrates a series of steps taken in one embodiment when performing an iterative luminance line consideration procedure.

Each encoding procedure begins with the process illustrated in FIG. 6 of selecting a set of candidate luminance lines to be used for the encoding. Firstly, at step 200, the average pixel colour of the half-block is determined. Then, at step 205 the three encodable luminance lines closest to the average pixel colour are selected. These three luminance lines surround the average pixel colour in the three dimensional RGB space used for the encoding. Then at step 210, for each of these luminance lines the sum of squares distance of the colours of the pixels to the nearest point on that luminance line (the "total offset") is calculated and each luminance line is added to a candidate set of luminance lines. Within this candidate set of luminance lines each of the three initially selected luminance lines are flagged as "parent" lines and the set is sorted with respect to the sum of squares distance calculated for each. Next, an iterative luminance line selection procedure is carried out beginning at step 215.

At step 215 a luminance line which is flagged as a "parent" line in the candidate list is selected. Then, at step 220 it is determined if this "parent" line has any neighbouring "daughter" lines which are at higher colour saturation than the parent. Note that in 3D colour space there are generally two neighbouring daughter luminance lines with higher saturation for each parent. Note also that a neighbouring daughter line which has already been examined (via a different parent) will generally not be re-considered. If such neighbouring daughter luminance lines exist, then at step 225, a daughter luminance line is selected and the sum of squares distance from the colours of the pixels of the half-block to this daughter luminance line is calculated. Then at step 230 it is determined if this sum of squares distance is not greater than the sum of squares distance for the parent luminance line of this daughter. If this is true, then at step 235 this daughter line is added to the candidate set of lines sorted by the sum of squares distance. Finally at step 240 it is determined if the sum of squares is non-zero and if it is, then this daughter is also flagged as a parent in the candidate list.

Having added this daughter to the candidate set of lines, at step 250 it is determined if there is another daughter line of the current parent under consideration, and if there is the flow returns to step 225 to process that daughter line. If however there is not another daughter line of the current parent, or if at step 220 (described above) it is determined that the current parent under consideration does not have any neighbouring daughter luminance lines with higher saturation, then the flow proceeds to step 255 where it is determined if there is another luminance line in the candidate set of lines which is flagged as a parent and has not yet been processed. If there is, then the flow returns to step 215 to begin processing that parent line. If there are no other unprocessed parent lines in the candidate set then the flow proceeds to step 260 at which point the candidate line generation process is completed.

With a candidate set of luminance lines selected according to the procedure described in FIG. 6, the set of candidate luminance lines can then be considered to determine which gives the base colour which results in the best encoding for this half-block. This procedure is carried out in one embodiment according to the steps schematically illustrated in FIG. 7. Firstly, from the candidate set of luminance lines sorted according to their total offset (i.e. the sum of squares distance of the colours of the pixels of the half-block to the nearest point on that luminance line), the line with the lowest offset is selected at step 300. Then, at step 305 the best encoding available for this line (i.e. using the set of base colours and luminance offsets which define this line) is determined. More detail of this will be described below with reference to FIG. 8. Having determined the best encoding for this line, at step 310 the encoding error for this line is determined as the sum of squares distance between the colours of the original pixels of this half-block and the set of encoded pixel colours according to this encoding. If this encoding error is the best (i.e. lowest) encoding error that has been thus far determined, then it is set as the current best error. Then the flow proceeds to step 315 where it is determined if there is another candidate luminance line in the sorted list. If there is, then the flow proceeds to step 320 where the next closest luminance line (in terms of the calculated total offset) is selected. Then at step 325 it is checked if the sum of squares distance to this line (i.e. the total offset for this line)—according to which the line was sorted in the candidate list—is greater than the best error determined so far (see step 310). If it is, then it is not possible for this line or any further lines to improve on that best error and the flow proceeds to the concluding step at step 330 wherein the half-block is encoded using the line which gave that best error, and in particular using the base colour on that line which gave that best error. If however at step 325 it is found that the total offset for this next line in the candidate list does not exceed the best error calculated so far then the flow returns to step 305 to determine the best encoding for this next line, and at step 310 to see if the encoding error for this next line improves on the best error so far. If at any iteration it is determined at step 315 that there is no further candidate line list then the flow proceeds to step 330.

Figure 8:
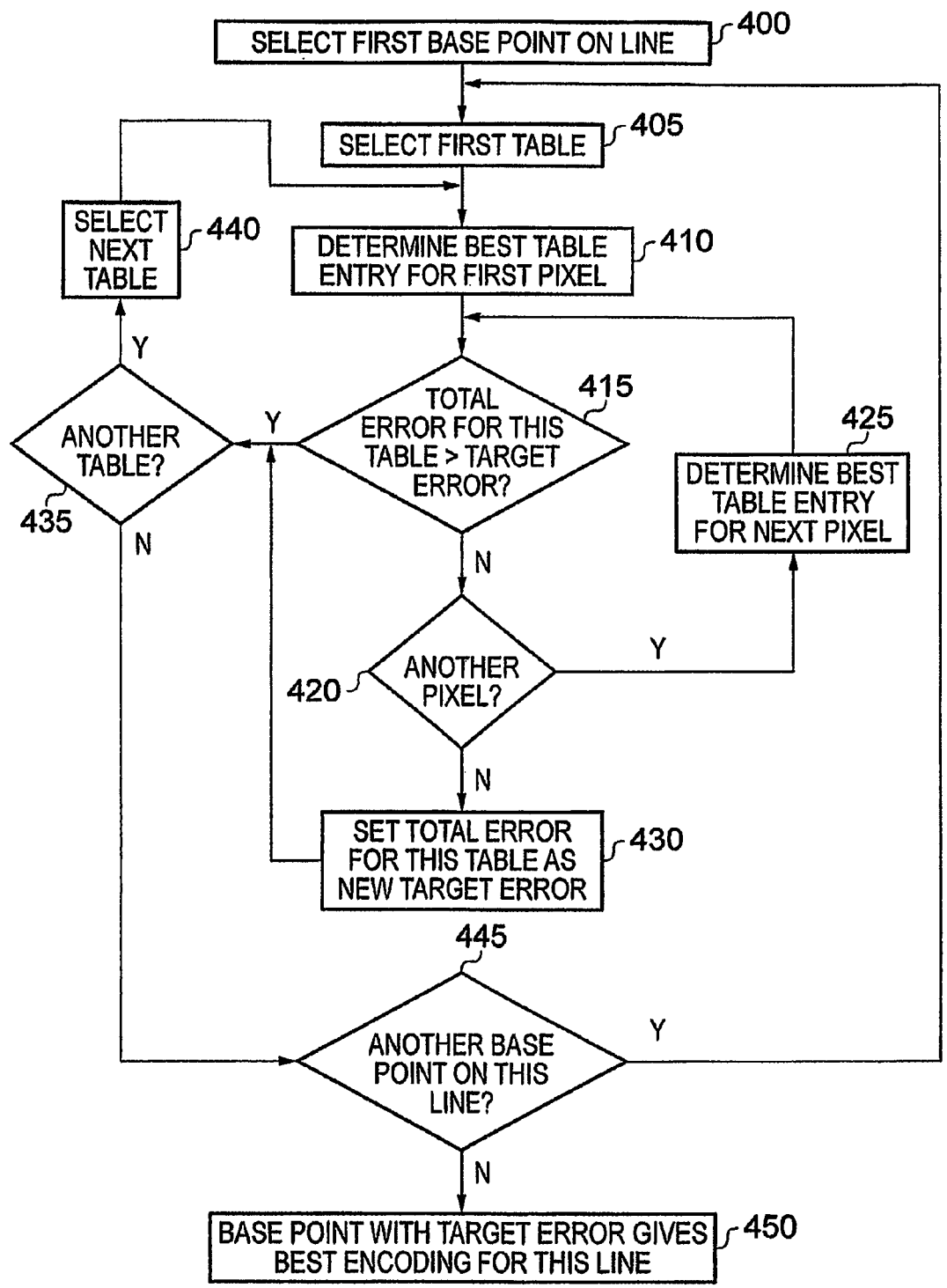
FIG. 8 schematically illustrates a series of steps taken in one embodiment in an iterative encoding determination procedure when considering a set of candidate base colours on a luminance line.

The procedure by which the best encoding for a given luminance line (step 305 in FIG. 7) is determined is now described with reference to the steps shown in FIG. 8. First, at step 400 the first base point (candidate base colour) on this luminance line is selected. Then at step 405 the first table of luminance offset values is selected. Then, from this table of luminance offset values, at step 410 the best table entry (i.e. luminance offset value) for the first pixel of the half-block is determined. "Best" here means the entry which results in the lowest encoding error for this pixel. The encoding error for this pixel, i.e. the distance in colour space between the encoded pixel colour and the original pixel colour, is added to a cumulative encoding error for this half-block. At step 415 it is checked if this cumulative encoding error exceeds a target error for this half-block. Note that on the very first iteration of the process described in FIG. 8 for the first base point, first table and first pixel, there is naturally no pre-existing target error and hence on this very first iteration the result at step 415 will always be to follow the "no" path. Then at step 420 it is determined if there is another pixel within the half-block and if there is then at step 425 then best table entry (for the current table under consideration) is determined for this next pixel. The encoding error associated with this next pixel is also calculated and added to the cumulative error for this table. If the loop of steps 415, 420 and 425 is completed for all pixels of the half-block (i.e. without failing the total error test at step 415) then at step 430 the total error calculated for the half-block for the current table is set as the new target error.

From either failing the total error test 415 or setting a new target error at step 430, the flow proceeds to step 435, at which it is determined if there is another table which can be considered for encoding this half-block. If there is then at step 440 that next table is selected and the flow returns to step 410 to try encoding the half-block of pixels using that table. If however another table is not available at step 435 then the flow proceeds to step 445 where it is determined if there is another base point (i.e. candidate base colour) on the luminance line currently under consideration. If there is, then the flow returns to step 405, where the iterative determination process with respect to the available tables is carried out again using that new base colour. Once all base points on this line have been considered then the flow concludes at step 450 where the best encoding for this line is determined to be given by the base colour and luminance offsets which gave the target error.

It should be noted that the above described distances calculated in the predetermined colour space are in some embodiments calculated as perception-weighted distances, taking into account the sensitivity of the human eye to the difference colour components. Also the encoding error, in some embodiments may be calculated in terms of a peak signal to noise ratio. Such techniques are familiar to the skilled person and are not described in detail herein.

Figure 9:
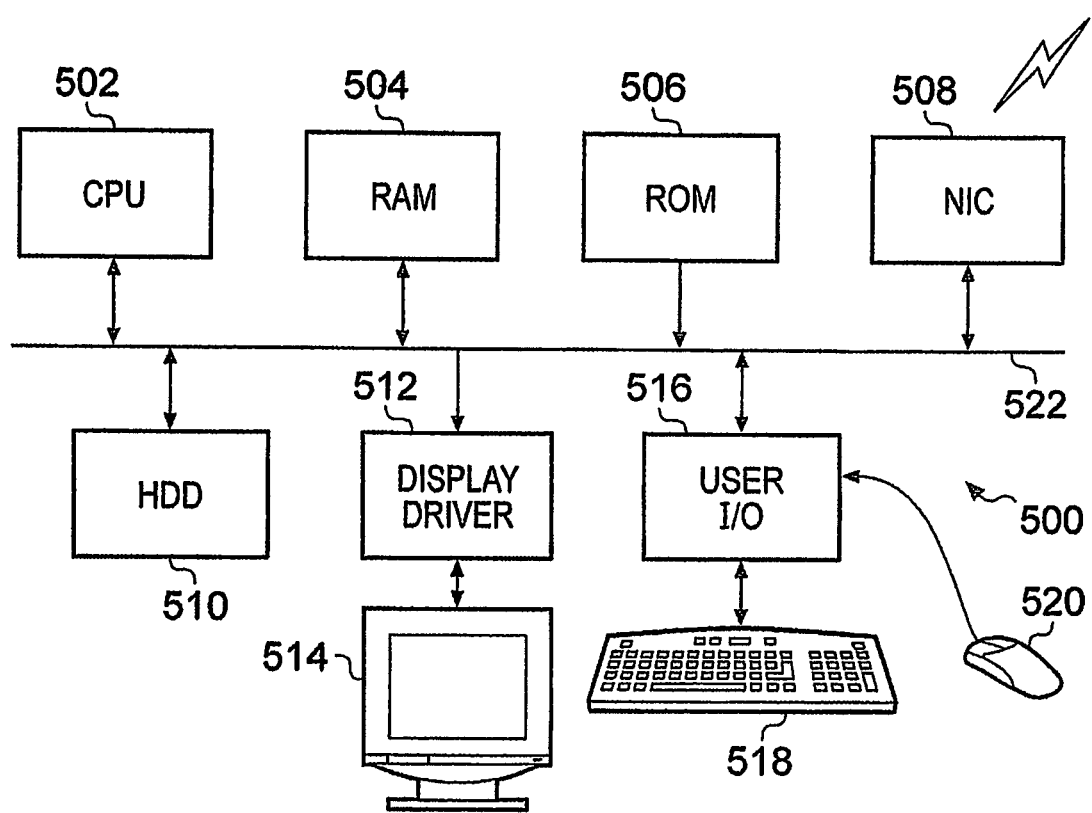
FIG. 9 schematically illustrates a general purpose computing device which may be used to implement various embodiments.

FIG. 9 schematically illustrates a general purpose computing device 500 of the type that may be used to implement the above described techniques. The general purpose computing device 500 includes a central processing unit 502, a random access memory 504 and a read only memory 506, connected together via bus 522. It also further comprises a network interface card 508, a hard disk drive 510, a display driver 512 and monitor 514 and a user input/output circuit 516 with a keyboard 518 and mouse 520 all connected via the common bus 522. In operation, when performing the necessary calculations to determine the encoding of each block of pixels, the central processing unit 502 will execute computer program instructions that may for example be stored in the random access memory 504 and/or the read only memory 506. Program instructions could be additionally be retrieved from the hard disk drive 510 or dynamically downloaded via the network interface card 508. The results of the processing performed may be displayed to a user via a connected display driver 512 and monitor 514. User inputs for controlling the operation of the general purpose computing device 500 may be received via a connected user input output circuit 516 from the keyboard 518 or the mouse 520. It will be appreciated that the computer program could be written in a variety of different computer languages. The computer program may be stored locally on a recording medium or dynamically downloaded to the general purpose computing device 500. When operating under control of an appropriate computer program, the general purpose computing device 500 can perform the above described techniques and can be considered to form an apparatus for performing the above described technique. The architecture of the general purpose computing device 500 could vary considerably and FIG. 9 is only one example.

The techniques described herein enable the encoding of an image to be performed much faster than the techniques know in the prior art. For example, creating ETC compressed textures using existing tools is very slow (300 to 400 pixels per second, or 30 minutes to 1 hour for a typical texture, for the highest quality supported by the existing tools). The techniques described herein speed up the compression process by anything up to 125 times (in the example cases tested) giving compression speeds of up to 40,000 pixels per second. Furthermore, in many cases, this was done whilst also producing a higher quality result than the existing algorithm. This is of particular benefit in the context of developing and testing graphics applications, since applications may include dozens or hundreds of textures, and the techniques described herein allow developers to assess more quickly the quality of the compressed textures during development.

Although a particular embodiment has been described herein, it will be appreciated that the invention is not limited thereto and that many modifications and additions thereto may be made within the scope of the invention. For example, various combinations of the features of the following dependent claims could be made with the features of the independent claims without departing from the scope of the present invention.

I claim:

1. An encoding method of generating an encoding of an image according to a predetermined encoding format, wherein said predetermined encoding format encodes said image in blocks of pixels, each block of pixels being encoded as a set of encoded pixel colours comprising a base colour and a set of luminance offsets with respect to said base colour,
wherein said base colour is selected from a predetermined set of base colours defined in a predetermined colour space,
wherein said set of luminance offsets is encoded as a set of references to at least one predetermined table of luminance offset values,
and wherein said predetermined set of base colours and said luminance offset values define a set of luminance lines in said predetermined colour space, said encoded pixel colours lying on at least one of said luminance lines,
said method comprising the steps, performed for said each block of pixels, of:
determining an average colour of colours of said each block of pixels in said predetermined colour space;
selecting at least one luminance line in dependence on an offset in said colour space of said average colour from said at least one luminance line;
identifying a set of candidate base colours lying on said at least one luminance line; and
determining, using said set of candidate base colours and said luminance offset values, said set of encoded pixel colours, wherein said base colour and said set of luminance offsets are selected in dependence on an encoding error indicative of a sum distance in said colour space between said set of encoded pixel colours and colours of said each block of pixels.

2. The encoding method as claimed in claim 1, wherein said offset in said colour space is a distance of closest approach between said average colour and said at least one luminance line.

3. The encoding method as claimed in claim 1, wherein said encoding error is calculated as a sum of squared distances between said set of encoded pixel colours and said colours of said block of pixels.

4. The encoding method as claimed in claim 1, wherein said step of selecting said at least one luminance line comprises selecting three luminance lines with smallest values of said offset.

5. The encoding method as claimed in claim 1, wherein said step of selecting at least one luminance line comprises an iterative luminance line selection procedure, said iterative luminance line selection procedure comprising the steps of:
examining a neighbouring luminance line of an already-selected luminance line; and
if a total offset of said colours of said block of pixels from said neighbouring luminance line is not greater than a total offset of said colours of said block of pixels from said already-selected luminance line, selecting said neighbouring luminance line.

6. The encoding method as claimed in claim 5, wherein said total offsets are calculated as a sum of squared distances between said colours of said block of pixels and respective nearest points of each luminance line.

7. The encoding method as claimed in claim 5, wherein said neighbouring luminance line is only examined if said neighbouring luminance line represents an increase in colour saturation from said already-selected luminance line.

8. The encoding method as claimed in claim 5, wherein said neighbouring luminance line is only examined if said already-selected luminance line has a non-zero value of said total offset.

9. The encoding method as claimed in claim 5, wherein when a plurality of luminance lines is selected, said plurality of luminance lines is sorted by said total offset for each luminance line.

10. The encoding method as claimed in claim 9, wherein said step of determining said set of encoded pixel colours comprises an iterative luminance line consideration procedure, wherein said step of identifying a set of candidate base colours lying on said at least one luminance line and said step of determining said set of encoded pixel colours are performed for said plurality of luminance lines in order of increasing total offset.

11. The encoding method as claimed in claim 10, wherein said step of determining said set of encoded pixel colours comprises an iterative encoding determination procedure comprising the steps, for each candidate base colour of said set of candidate base colours, of:
determining a candidate set of encoded pixel colours using said luminance offset values applied to said candidate base colour;
determining a candidate encoding error for said candidate set of encoded pixel colours indicative of a sum distance in said colour space between said colours of said block of pixels and said candidate set of encoded pixel colours;
if said candidate encoding error is lower than any previous candidate encoding errors determined for said block of pixels, setting said candidate encoding error as a best encoding error;
selecting as said base colour and said set of luminance offsets the candidate base colour and those luminance offset values which when applied to said candidate base colour give said best encoding error,
wherein, before considering a next luminance line, if said total offset for said next luminance line exceeds said best encoding error said iterative luminance line consideration procedure is terminated and neither said next luminance line nor any further luminance lines in said plurality of luminance lines are considered.

12. The encoding method as claimed in claim 1, wherein said step of determining said set of encoded pixel colours comprises an iterative encoding determination procedure comprising the steps, for each candidate base colour of said set of candidate base colours, of:
determining a candidate set of encoded pixel colours using said luminance offset values applied to said candidate base colour;
determining a candidate encoding error for said candidate set of encoded pixel colours indicative of a sum distance in said colour space between said colours of said block of pixels and said candidate set of encoded pixel colours;
if said candidate encoding error is lower than any previous candidate encoding errors determined for said block of pixels, setting said candidate encoding error as a best encoding error;
selecting as said base colour and said set of luminance offsets the candidate base colour and those luminance offset values which when applied to said candidate base colour give said best encoding error.

13. The encoding method as claimed in claim 12, wherein said at least one predetermined table of luminance offset values comprises a plurality of predetermined tables of luminance offset values, and said step of determining said candidate set of encoded pixel colours using said luminance offset values applied to said candidate base colour comprises iteratively determining said candidate set of encoded pixel colours using each table of said plurality of predetermined tables of luminance offset values.

14. The encoding method as claimed in claim 13, wherein said encoding error is determined cumulatively as a cumulative encoding error and, if said cumulative encoding error for a current table of luminance offset values under consideration exceeds said best encoding error, said determining said candidate set of encoded pixel colours using said current table of luminance offset values is terminated.

15. The encoding method as claimed in claim 14, wherein said cumulative encoding error is compared with said best encoding error on a pixel-by-pixel basis for said colours of said block of pixels.

16. The encoding method as claimed in claim 1, wherein said blocks each comprise a set of 2 pixels by 4 pixels.

17. The encoding method as claimed in claim 1, wherein at least one pair of adjacent blocks of said blocks of pixels is encoded in an interdependent fashion, a second block of said adjacent pair of blocks being encoded with reference to a first block of said adjacent pair of blocks.

18. The encoding method as claimed in claim 17, wherein said pair of blocks are horizontally adjacent.

19. The encoding method as claimed in claim 18, wherein said pair of blocks are vertically adjacent.

20. The encoding method as claimed in claim 17, further comprising determining for each block of pixels if said encoding error is lower when that block of pixels in encoded in said interdependent fashion or when that block of pixels in encoded in an independent fashion without reference to another block of pixels.

21. The encoding method as claimed in claim 20, further comprising iteratively determining for each block of pixels said encoding error for all encoding fashions and selecting the encoding fashion which gives an overall lowest value of said encoding error.

22. The encoding method as claimed in claim 1, wherein calculations of distances in said colour space are perception-weighted according to human sensitivity to each colour component of said colour space.

23. The encoding method as claimed in claim 1, wherein said encoding error is calculated as a peak signal to noise ratio.

24. The encoding method as claimed in claim 1, wherein said image is a texture image.

25. The encoding method as claimed in claim 1, wherein said predetermined encoding format is an ETC format.

26. A computer program product including a non-transitory computer readable storage medium storing a computer program which, when loaded on a computer, causes the computer to carry out the encoding method of claim 1.

27. An encoding apparatus configured to generate an encoding of an image according to a predetermined encoding format, wherein said predetermined encoding format encodes said image in blocks of pixels, each block of pixels being encoded as a set of encoded pixel colours comprising a base colour and a set of luminance offsets with respect to said base colour, wherein said base colour is selected from a predetermined set of base colours defined in a predetermined colour space, wherein said set of luminance offsets is encoded as a set of references to at least one predetermined table of luminance offset values, and wherein said predetermined set of base colours and said luminance offset values define a set of luminance lines in said predetermined colour space, said encoded pixel colours lying on at least one of said luminance lines, said apparatus, configured to act on said each block of pixels, comprising:

an average colour determination unit configured to determine an average colour of said each block of pixels in said predetermined colour space;

a luminance line selection unit configured to select at least one luminance line in dependence on an offset in said colour space of said average colour from said at least one luminance line;

a candidate base colour identifier configured to identify a set of candidate base colours lying on said at least one luminance line; and a determination unit configured to determine, using said set of candidate base colours and said luminance offset values, said set of encoded pixel colours, wherein said base colour and said set of luminance offsets are selected in dependence on an encoding error indicative of a sum distance in said colour space between said set of encoded pixel colours and said colours of said each block of pixels.

28. Encoding apparatus means for generating an encoding of an image according to a predetermined encoding format, wherein said predetermined encoding format encodes said image in blocks of pixels, each block of pixels being encoded as a set of encoded pixel colours comprising a base colour and a set of luminance offsets with respect to said base colour, wherein said base colour is selected from a predetermined set of base colours defined in a predetermined colour space, wherein said set of luminance offsets is encoded as a set of references to at least one predetermined table of luminance offset values, and wherein said predetermined set of base colours and said luminance offset values define a set of luminance lines in said predetermined colour space, said encoded pixel colours lying on at least one of said luminance lines, said apparatus means, configured to act on said each block of pixels, comprising:

average colour determination means for determining an average colour of said each block of pixels in said predetermined colour space;

luminance line selection means for selecting at least one luminance line in dependence on an offset in said colour space of said average colour from said at least one luminance line;

candidate base colour identification means for identifying a set of candidate base colours lying on said at least one luminance line; and determination means for determining, using said set of candidate base colours and said luminance offset values, said set of encoded pixel colours, wherein said base colour and said set of luminance offsets are selected in dependence on an encoding error indicative of a sum distance in said colour space between said set of encoded pixel colours and said colours of said each block of pixels.

* * * * *